United States Patent
Briliauskas

(10) Patent No.: US 12,511,389 B2
(45) Date of Patent: Dec. 30, 2025

(54) MULTI-LEVEL MALWARE CLASSIFICATION MACHINE-LEARNING METHOD AND SYSTEM

(71) Applicant: UAB 360 IT, Vilnius (LT)

(72) Inventor: Mantas Briliauskas, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 18/366,875

(22) Filed: Aug. 8, 2023

(65) Prior Publication Data

US 2024/0232355 A1    Jul. 11, 2024

Related U.S. Application Data

(63) Continuation of application No. 18/152,476, filed on Jan. 10, 2023.

(51) Int. Cl.
G06F 21/56    (2013.01)

(52) U.S. Cl.
CPC ...... G06F 21/566 (2013.01); G06F 2221/033 (2013.01)

(58) Field of Classification Search
CPC .......................... G06F 21/566; G06F 2221/033
See application file for complete search history.

(56) References Cited

U.S. PATENT DOCUMENTS

| | | | |
|---|---|---|---|
| 11,182,481 B1 * | 11/2021 | Oliver | G06N 20/00 |
| 11,354,409 B1 * | 6/2022 | Kenefick | G06F 21/51 |
| 11,636,161 B1 * | 4/2023 | Chang | G06F 16/906 |
| | | | 707/737 |
| 2018/0097822 A1 | 4/2018 | Huang | |
| 2020/0082083 A1 * | 3/2020 | Choi | G06N 20/00 |
| 2021/0073890 A1 * | 3/2021 | Lee | G06N 20/20 |
| 2021/0232682 A1 | 7/2021 | Mitra | |
| 2022/0036208 A1 | 2/2022 | Rao | |
| 2023/0029679 A1 * | 2/2023 | Lancioni | G06N 20/00 |
| 2023/0098919 A1 * | 3/2023 | Kulaga | G06F 16/285 |
| | | | 726/23 |

OTHER PUBLICATIONS

Oliver, Jonathan, et al. "Fast Clustering of High Dimensional Data Clustering the Malware Bazaar Dataset." 2022, 11 pages. http://tlsh.org/papersDir/n21_opt_cluster.pdf.
Choi, Sunoh. "Combined kNN Classification and hierarchical similarity hash for fast malware detection." Applied Sciences 10.15 (2020): 5173.

(Continued)

*Primary Examiner* — Theodore C Parsons
*Assistant Examiner* — Alan L Kong
(74) *Attorney, Agent, or Firm* — Meunier Carlin & Curfman LLC

(57) ABSTRACT

A cyber security method and system for detecting malware via an anti-malware application employing a fast locality-sensitive hashing evaluation using a vantage-point tree (VPT) structure for the indication of malicious files and non-malicious files. The locality-sensitive hashing evaluation using the VPT structure can be performed prior to initiating the deeper, more computationally intensive evaluation and is used to identify with high confidence a scanned file or data object being (i) a malicious file, (ii) a non-malicious file, or a low confidence measure of the two.

18 Claims, 6 Drawing Sheets

(56) References Cited

OTHER PUBLICATIONS

Unpublished U.S. Appl. No. 17/725,718, filed Apr. 21, 2022.
Combing through the fuzz: Using fuzzy hashing and deep learning to counter malware detection evasion techniques. 2021. on-line at: https://www.microsoft.com/security/blog/2021/07/27/combing-through-the-fuzz-using-fuzzy-hashing-and-deep-learning-to-counter-malware-detection-evasion-techniques/.
Kumar, Neeraj, Li Zhang, and Shree Nayar. "What is a good nearest neighbors algorithm for finding similar patches in images?. " European conference on computer vision. Springer, Berlin, Heidelberg, 2008.
Fuzzy hash: https://www.microsoft.com/security/blog/2021/07/27/combing-through-the-fuzz-using-fuzzy-hashing-and-deep-learning-to-counter-malware-detection-evasion-techniques/.
Non-final Office Action in connection to U.S. Appl. No. 18/152,476, dated Oct. 24, 2024.
Interview Summary in connection to U.S. Appl. No. 18/152,476, dated Jan. 13, 2025.
Advisory Action in connection to U.S. Appl. No. 18/152,476, dated May 29, 2025.
Final Office Action in connection to U.S. Appl. No. 18/152,476, dated Mar. 21, 2025.
Non-Final Office Action in connection to U.S. Appl. No. 18/448,466, dated Jul. 29, 2025.
Hu, Xin et al., Large-Scale Malware Indexing Using Function-Call Graphs, In Proceedings of the 16th ACM conference on Computer and communications security (CCS '009) (2009), 10 pages.

\* cited by examiner

| | Recursive | Iterative |
|---|---|---|
| 1 | define search(object){ | define search(object){ |
| 2 | hash = make_fuzzy_hash(object); | hash = make_fuzzy_hash(object); |
| 3 | heap = make_limited_size_heap(); | heap = make_limited_size_heap(); |
| 4 | search_from_node(vpt_root, hash, | tasks = [vpt_root]; |
| 5 | heap); | |
| 6 | return heap; | |
| 7 | } | |
| 8 | | |
| 9 | define search_from_node(node, hash, | while tasks { |
| 10 | heap) { | node = tasks.pop(0); |
| 11 | d = calc_distance(node.hash, hash); | d = calc_distance(node.hash, hash); |
| 12 | heap.add(d, hash); // inner logic checks | heap.add(d, hash); |
| 13 | if result fits | |
| 14 | | |
| 15 | // early stop | // early stop |
| 16 | if d == 0 { | if d == 0 { |
| 17 | return; | break; |
| 18 | } | } |
| 19 | | |
| 20 | is_near_vantage_point = \| d - | is_near_vantage_point = \| d - |
| 21 | node.distance \| < threshold; | node.distance \| < threshold; |
| 22 | | |
| 23 | if d < node.distance { | if d < node.distance { |
| 24 | if node.left is not None { | if node.left is not None { |
| 25 | search_from_node(node.left, hash, | tasks.add(node.left); |
| 26 | heap); | } |
| 27 | } | if is_near_vantage_point and |
| 28 | if is_near_vantage_point and | node.right is not None { |
| 29 | node.right is not None { | tasks.add(node.right); |
| 30 | search_from_node(node.right, | } |
| 31 | hash, heap); | } |
| 32 | } | } else { |
| 33 | } else { | if node.right is not None { |
| 34 | if node.right is not None { | tasks.add(node.right); |
| 35 | search_from_node(node.right, | } |
| 36 | hash, heap); | |
| 37 | } | if is_near_vantage_point and |
| 38 | if is_near_vantage_point and node.left | node.left is not None { |
| 39 | is not None { | tasks.add(node.left); |
| 40 | search_from_node(node.left, hash, | } |
| 41 | heap); | } |
| 42 | } | }; |
| 43 | } | |
| 44 | } | return heap; |
| 45 | | } |

FIG. 5

MULTI-LEVEL MALWARE CLASSIFICATION MACHINE-LEARNING METHOD AND SYSTEM

CROSS-REFERENCE TO RELATED APPLICATIONS

This application is a continuation of U.S. patent application Ser. No. 18/152,476, filed Jan. 10, 2023, which is incorporated herein by reference in its entirety.

BACKGROUND

Cyber security service providers (CSSPs) use file hashes to check if a file on a user's device is present in a known malicious file database as a means to detect malware. CSSPs can run a file on users' devices using a pre-negotiated hashing algorithm such as MD5, SHA-1, SHA-2, NTLM, and LANMAN and test the output against a library of a set of locality parameters of known malicious files. Many lack sufficient generality to detect variations in such files.

While the vantage-point tree is a well-known searching technique, the detection rate of malicious malware using locality and distance metrics is insufficient for commercial viability while also being computationally intensive for searching large-scale datasets. Vantage-point tree (VPT) structure employs a metric tree that segregates data in a metric space by choosing a position in the space (the "vantage point") and partitioning the fuzzy hash into two parts: those points that are nearer to the vantage point than a threshold, and those points that are not. By recursively applying this procedure in O log (n) operations to partition the data into smaller and smaller sets, a tree data structure is created in which neighbors in the tree are likely to be neighbors in the space.

There are benefits to addressing these and other technical challenges to improve cyber security protection.

SUMMARY

A cyber security method and system are disclosed for detecting malware via an anti-malware application employing locality-sensitive hashing evaluation (e.g., fuzzy hash) using a vantage-point tree (VPT) structure for the indication of malicious files and non-malicious files. The locality-sensitive hashing evaluation using the VPT structure is performed prior to initiating the deeper, more computationally intensive evaluation and is used to identify with high confidence a scanned file or data object being (i) a malicious file, (ii) a non-malicious file, or a low confidence measure of the two. Low confidence measure of the scanned file or data object based on the distance metric in the locality-sensitive hashing evaluation can then be subjected to a thorough machine learning-based assessment. The VPT search is further optimized, in some embodiments, for speed and computation consideration by performing the VPT search in a non-recursive manner that can reduce the memory usage in the search without substantially affecting the depth of the search while providing a more comprehensive search that is closer matching to the training data set. The operation can be further optimized with top-K and heap operation to further improve implementation. The computation required for the locality-sensitive hashing evaluation using the VPT structure can be optimized such that the memory requirements can benefit from CPU cache (e.g., L2 caching).

Because the known malicious-file databases are not comprehensive to all malicious files which are continuously being adapted, non-static classification techniques such as the exemplary locality-sensitive hashing method (e.g., fuzzy hash) and exemplary machine learning classification can beneficially detect known malicious code in addition to its variants. Machine learning classification can be particularly useful in detecting malware based on patterns established from the training data that are more generalizable at identifying new strains of malware rather than on the static binary files or their representative data (e.g., hashes).

In an aspect, a system is disclosed comprising a processor; and a memory having instructions stored thereon (e.g., for generating a malware classification output for a target code using a malware classification operation based on similarity to known classified files or objects), wherein execution of the instructions by the processor causes the processor to: receive a target code comprising at least one of a file or data object being scanned for a presence or non-presence of malware; identify, via a similarity-based operation comprising a locality-sensitive hashing operation assessed using a vantage-point tree structure, as a malware classification operation, a malware classification output with respect to the target code; in an instance in which the malware classification output satisfies a first similarity threshold, label the target code as a non-malware file or object; and in an instance in which the malware classification output satisfies a second similarity threshold, label the target code as a malware file or object.

In some embodiments, the instructions for the malware classification operation comprise instructions to determine, via a vantage-point tree search operation, a vantage-point tree object for the target code with respect to a set of stored malware-classified files or objects and a set of stored non-malware classified files or object.

In some embodiments, the vantage-point tree search operation iteratively evaluates each node of the vantage-point tree object as a task, wherein sub-nodes in the vantage-point tree object are added as new tasks to the iterative operation.

In some embodiments, the vantage-point tree search operation evaluates the top nearest neighbor distances of a fuzzy hash of the target code in the vantage-point tree object.

In some embodiments, the vantage-point tree search operation stores the top nearest neighbor distances in a heap.

In some embodiments, the heap has a pre-defined heap size, wherein in an instance in which the heap size exceeds a predetermined limit, a last element of the heap is removed.

In some embodiments, the heap size is a user-configurable parameter.

In some embodiments, the vantage-point tree search operation is configured to halt operation if a distance of zero is determined for a given node.

In some embodiments, the target code is a binarized file.

In some embodiments, in an instance in which the malware classification output fails to satisfy the first similarity threshold and a second similarity threshold, the instructions cause the processor to generate, via a machine learning malware classification operation (e.g., using a trained malware classification machine learning model), a second malware classification output, wherein the machine learning malware classification output is employed to reject the target code as a malware file or object.

In another aspect, a non-transitory computer-readable medium is disclosed comprising instruction code for generating a malware classification output for a target code using a malware classification operation based on similarity to known classified files or objects, the non-transitory computer-readable medium having instructions stored thereon that, when executed by one or more processors, cause the one or more processors to receive the target code comprising at least one of a file or data object being scanned for a presence or non-presence of malware; identify, via a similarity-based operation comprising a locality-sensitive hashing operation assessed using a vantage-point tree structure, as a malware classification operation, a malware classification output with respect to the target code; in an instance in which the malware classification output satisfies a first similarity threshold, label the target code as a non-malware file or object; and in an instance in which the malware classification output satisfies a second similarity threshold, label the target code as a malware file or object.

In some embodiments, the instructions for the malware classification operation comprise instructions to determine, via a vantage-point tree search operation, a vantage-point tree object for the target code with respect to a set of stored malware-classified files or objects and a set of stored non-malware classified files or object.

In some embodiments, the vantage-point tree search operation iteratively evaluates each node of the vantage-point tree object as a task, wherein sub-nodes in the vantage-point tree object are added as new tasks to the iterative operation.

In some embodiments, the vantage-point tree search operation evaluates top nearest neighbor distances of a fuzzy hash of the target code in the vantage-point tree object.

In some embodiments, the vantage-point tree search operation stores the top nearest neighbor distances in a heap.

In some embodiments, the heap has a pre-defined heap size, wherein in an instance in which the heap size exceeds a predetermined limit, a last element of the heap is removed.

In some embodiments, the heap size is a user-configurable parameter.

In some embodiments, the vantage-point tree search operation is configured to halt operation if a distance of zero is determined for a given node.

In some embodiments, the target code is a binarized file.

In some embodiments, in an instance in which the malware classification output fails to satisfy the first similarity threshold and a second similarity threshold, the instructions cause the processor to generate, via a machine learning malware classification operation (e.g., using a trained malware classification machine learning model), a second malware classification output, wherein the machine learning malware classification output is employed to reject the target code as a malware file or object.

In another aspect, a method is disclosed to operate the system of any one of the above-discussed systems or non-transitory computer-readable medium.

In another aspect, a method is disclosed for generating a malware classification output for a target code, the method comprising receiving the target code; identifying, via a similarity-based operation comprising a locality-sensitive hashing operation assessed using one or more vantage-point tree structures, as a first malware classification operation, a malware classification output with respect to the target code, wherein the similarity-based operation is performed entirely using CPU caching (e.g., L2 caching); in an instance in which the first malware classification output fails to satisfy a first confidence threshold associated with a malware classification or a second confidence threshold associated with a non-malware classification, generating, using a trained malware classification machine learning model, a second malware classification output; and performing one or more malware-based actions, including to reject, pass, and/ or quarantine the target code, based on the first malware classification output or the second malware classification output.

In some embodiments, the second malware classification output comprises a trained neural network model.

In some embodiments, the trained malware classification machine learning model is not executed until after the first malware classification output is generated.

In some embodiments, the similarity-based operation is assessed with respect to a library of malware code.

In some embodiments, the similarity-based operation is further assessed with respect to a library of non-malware code.

In some embodiments, the similarity-based operation calculates a first distance value of fuzzy hashes of the target code to nodes in a first vantage-point tree structure of the one or more vantage-point tree structures, wherein the nodes in a first vantage-point tree structure are generated by a first set of malware code.

In some embodiments, the similarity-based operation calculates a second distance value of fuzzy hashes of the target code to nodes in a second vantage-point tree structure, wherein the nodes in the second vantage-point tree structure are generated by a set of non-malware code or a second set of malicious code that is different from the first set of malicious code.

In some embodiments, the fuzzy hashes of the target code are added to the set of non-malware code or the set of malware code to be subsequently used to update at least one of the first vantage-point tree structure or the second vantage-point tree structure.

In another aspect, a system is disclosed comprising a processor; and a memory having instructions stored thereon for generating a malware classification output for a target code, wherein execution of the instructions by the processor causes the processor to: receive the target code; identify, via a similarity-based operation comprising a fast locality-sensitive hashing operation assessed using one or more vantage-point tree structures, as a first malware classification operation, a malware classification output with respect to the target code; in an instance in which the first malware classification output fails to satisfy a first confidence threshold associated with a malware classification or a second confidence threshold associated with a non-malware classification, generate, using a trained malware classification machine learning model, a second malware classification output; and perform one or more malware-based actions, including to reject, pass, and/or quarantine the target code, based on the first malware classification output or the second malware classification output.

In some embodiments, the second malware classification output comprises a trained neural network model.

In some embodiments, the trained malware classification machine learning model is not executed until after the first malware classification output is generated.

In some embodiments, the similarity-based operation is assessed with respect to a library of malware code.

In some embodiments, the similarity-based operation is further assessed with respect to a library of non-malware code.

In some embodiments, the similarity-based operation calculates a first distance value of fuzzy hashes of the target code to nodes in a first vantage-point tree structure of the one or more vantage-point tree structures, wherein the nodes in a first vantage-point tree structure are generated by a first set of malware code.

In some embodiments, the similarity-based operation calculates a second distance value of fuzzy hashes of the target code to nodes in a second vantage-point tree structure, wherein the nodes in the second vantage-point tree structure are generated by a set of non-malware code or a second set of malicious code that is different from the first set of malicious code.

In some embodiments, the fuzzy hashes of the target code are added to the set of non-malware code or the set of malware code to be subsequently used to update at least one of the first vantage-point tree structure or the second vantage-point tree structure.

In another aspect, a non-transitory computer-readable medium is disclosed having instructions stored thereon for generating a malware classification output for a target code, wherein execution of the instructions by a processor causes the processor to: receive the target code; identify, via a similarity-based operation comprising a fast locality-sensitive hashing operation assessed using one or more vantage-point tree structures, as a first malware classification operation, a malware classification output with respect to the target code; in an instance in which the first malware classification output fails to satisfy a first confidence threshold associated with a malware classification or a second confidence threshold associated with a non-malware classification, generate, using a trained malware classification machine learning model, a second malware classification output; and perform one or more malware-based actions, including to reject, pass, and/or quarantine the target code, based on the first malware classification output or the second malware classification output.

In some embodiments, the second malware classification output comprises a trained neural network model.

In some embodiments, the trained malware classification machine learning model is not executed until after the first malware classification output is generated.

In some embodiments, the similarity-based operation is assessed with respect to a library of malware code.

In some embodiments, the similarity-based operation is further assessed with respect to a library of non-malware code.

In some embodiments, the similarity-based operation calculates a first distance value of fuzzy hashes of the target code to nodes in a first vantage-point tree structure of the one or more vantage-point tree structure, wherein the nodes in a first vantage-point tree structure are generated by a first set of malware code, and wherein the similarity-based operation calculates a second distance value of fuzzy hashes of the target code to nodes in a second vantage-point tree structure, wherein the nodes in the second vantage-point tree structure are generated by a set of non-malware code or a second set of malicious code that is different from the first set of malicious code.

In some embodiments, the fuzzy hashes of the target code are added to the set of non-malware code or the set of malware code to be subsequently used to update at least one of the first vantage-point tree structure or the second vantage-point tree structure.

BRIEF DESCRIPTION OF THE DRAWINGS

Various objects, aspects, features, and advantages of the disclosure will become more apparent and better understood by referring to the detailed description taken in conjunction with the accompanying drawings, in which reference characters identify corresponding elements throughout. In the drawings, reference numbers generally indicate identical, functionally similar, and/or structurally similar elements.

FIG. 5 shows an example implementation of the vantage-point tree search operation in accordance with another illustrative embodiment.

DETAILED DESCRIPTION

Referring generally to the figures, malware detection systems and methods for generating and training malware classification machine learning models are provided. Various embodiments of the present disclosure disclose methods for performing malware detection/classification operations that improve the efficiency and/or reliability of these steps/operations.

Example System #1

Figure 1A:
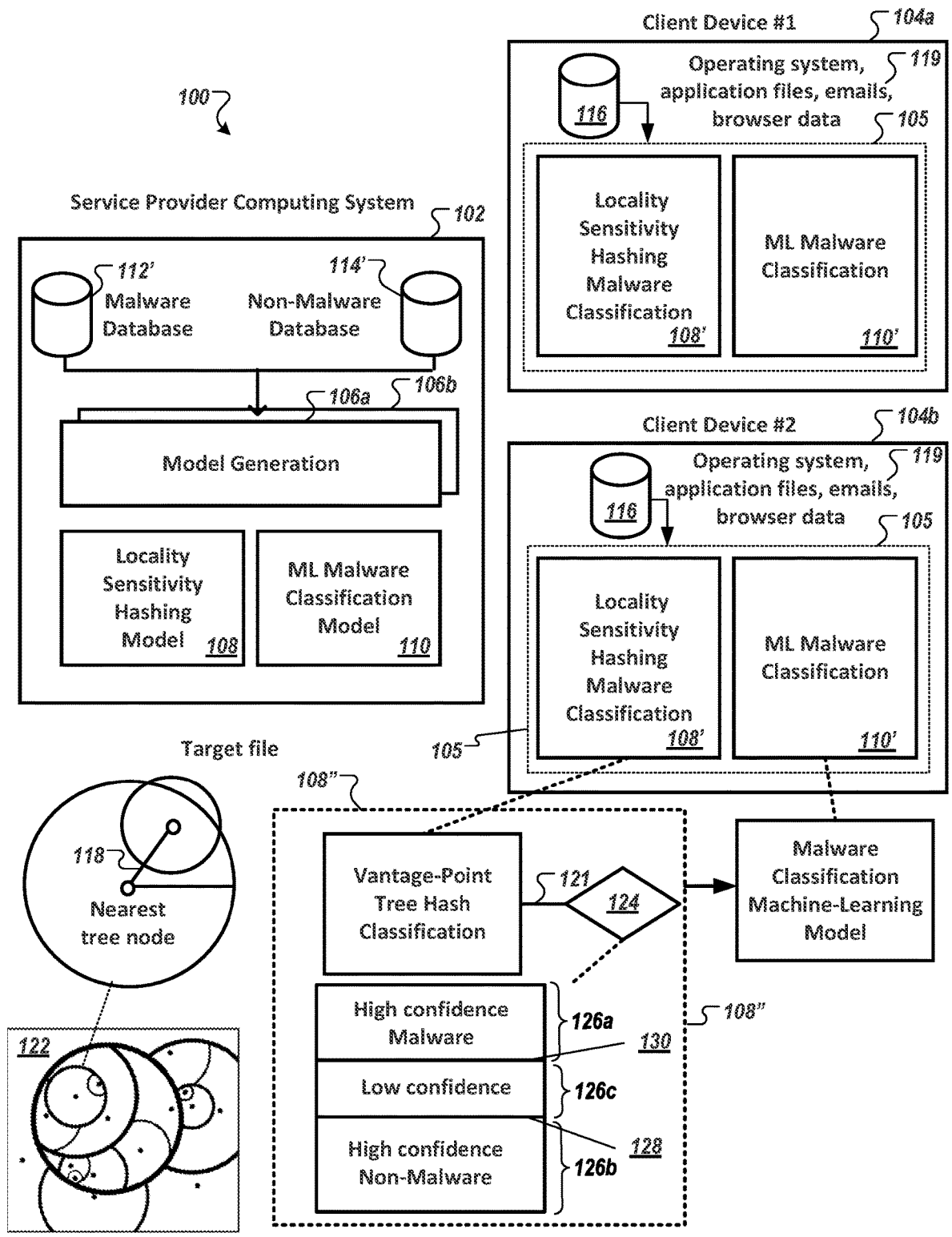
FIG. 1A shows an example anti-malware application environment comprising a service provider computing system and a set of client devices configured to perform locality-sensitive hashing evaluation (e.g., fuzzy hash) using a vantage-point tree (VPT) structure in accordance with an illustrative embodiment.
Figure 1B:
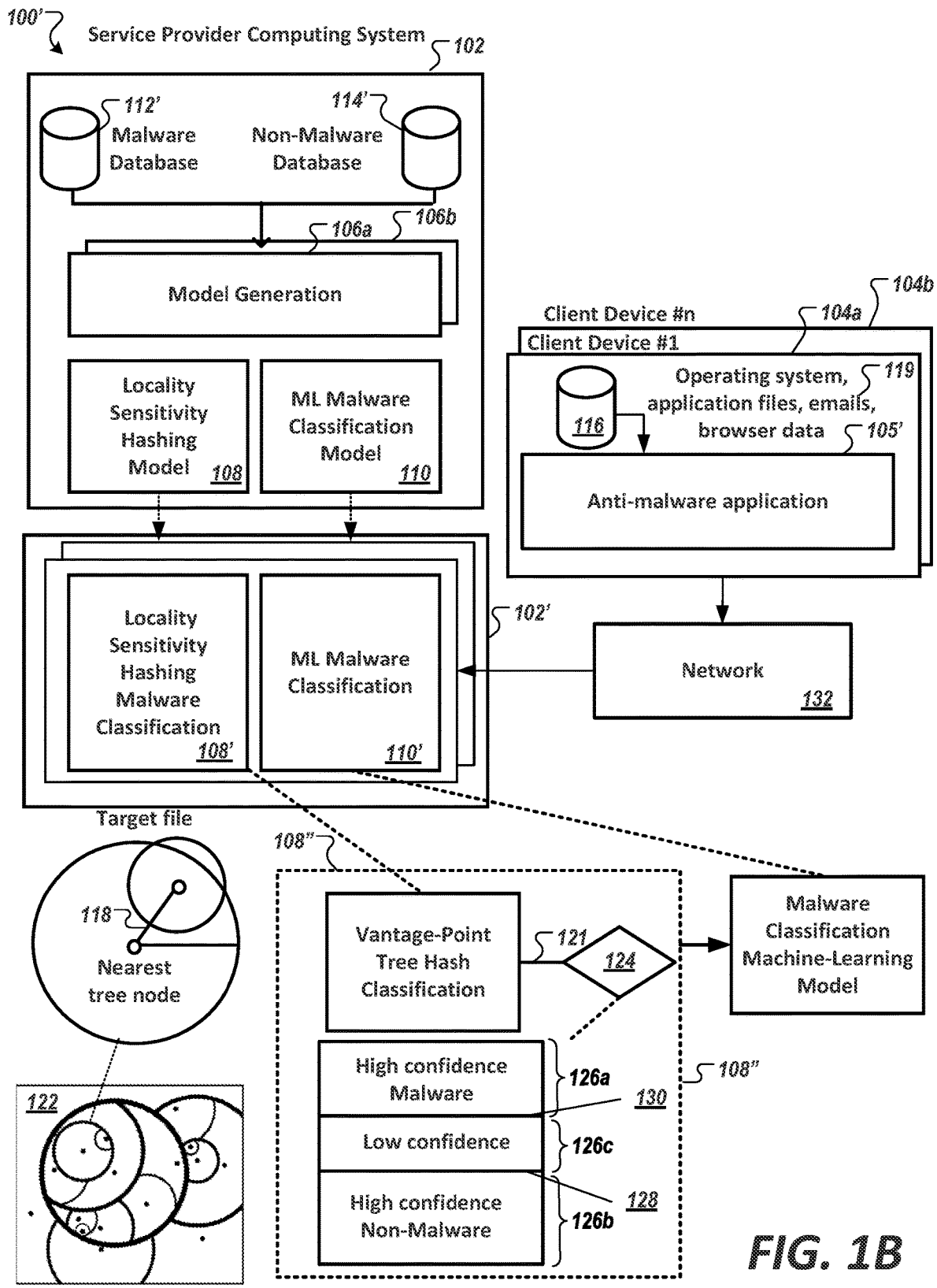
FIG. 1B shows another example anti-malware application environment comprising a service provider computing system and a set of client devices configured to perform locality-sensitive hashing evaluation using a vantage-point tree structure in accordance with another illustrative embodiment.

FIG. 1A shows an example anti-malware application environment 100 comprising a service provider computing system 102 and a set of client devices 104 (shown as "Client Device #1" 104a and "Client Device #2" 104b). FIG. 1B shows another example anti-malware application environment 100 (shown as 100') comprising a service provider computing system and a set of client devices configured to perform locality-sensitive hashing evaluation (e.g., fuzzy hash) using a vantage-point tree (VPT) structure in accordance with another illustrative embodiment.

In the example shown in FIG. 1A, service provider computing system 102 includes a set of model generation modules 106 (shown as 106a, 106b) configured to generate a model 108 for a locality-sensitive hashing model having a vantage-point tree data structure and a machine learning classification model 110 for malware detection from libraries of known malware 112 and known non-malware code 114 (shown stored in "Malware Database" 112' and "Non-Malware Database" 114'). The malware and non-malware code (112, 114) may be binary files or snippets/portions of binary files. Non-binary instruction libraries may be converted to binary files as a part of data preparation or normalization process.

Models 108 and 110 can be provided to the client devices 104a, 104b as an anti-malware application 105 (shown as "Malware classification machine-learning model" 105') that can scan for malware code in a computer-executable file or parseable computer instructions of a computer-executable script. The file may be a computer-executable file (e.g., a binary file), an encoded/compressed file of the same, or a set of files. The file may be embedded or attached in electronic communication (e.g., email). The computer-executable script may be descriptive mark-up language (non-binary file) for a document or website component to be parsed or executed by a web browser. The computer-executable script may be cascading style sheet (CSS) files that are called upon or operate with the script. The files may execute on a personal computing device, such as laptops or tablets, a computer server, a mobile device such as a smartphone, network equipment such as a router or switch, a network-connected machine-to-machine (M2M), or an Internet-of-Thing (IoT) device such as a home-networked-camera, appliance, home controller, as well as industrial or manu-facturing-network equipment.

In some embodiments, a malware classification machine learning model may be configured to determine one or more similarity measures with respect to an encoded representation (e.g., embedding) of an input data object (e.g., a file or document) and one or more stored data objects in a multi-dimensional embedding space. An example similarity measure may be determined using various distance operations such as, but not limited to, cosine distance, Jaccard distance, k nearest neighbors, and/or the like. In some embodiments, a malware classification machine learning model may be trained using labeled training data (e.g., distances between an input data object and a plurality of similar objects).

As used herein, the term "malware code" refers to a virus code, a spyware code, a trojan code, a snooping code, and bloatware that can disrupt or compromise the operation, privacy, and/or security of a computer, server, client, or computer network. Virus code generally includes instructions for a computer virus, which is a type of computer program that, when executed, replicates itself by modifying other computer programs and inserting its own code. Spyware generally includes instructions for a software with malicious behavior that aims to gather information about a person or organization and send it to another entity that harms the user by endangering the device's security or by violating the person's privacy. Trojan code generally includes instructions for a malware that misleads the user or computer system or networks of its true intent. Unlike computer viruses, worms, and rogue security software, trojan codes do not typically inject themselves into other files or otherwise propagate themselves. Spyware code generally includes instructions that try to keep it hidden while it secretly records information and tracks internet-usage activities on a computer, mobile device, or computing network equipment. Snooping code, as used herein, refers to spyware code that tries to keep itself hidden while it secretly records information and tracks internet-usage activities and intercepts communication associated with another computer. Bloatware code generally includes instructions for unwanted and potentially harmful software, akin to junk mail, loaded on a computing device employing sales and marketing techniques that can affect a user's experience and device performance.

Locality-Sensitive Hashing Scan in a Vantage-Point Tree Structure. At the client device 104, the model 108 (shown as 108') of the locality-sensitive hashing operation with the vantage-point tree data structure (also referred to as a VPT hash classification model 108) can be employed to predict or provide a likelihood or confidence value or score (i) whether a target code 119 (e.g., operating system files, application files, emails, browser data, API calls, etc. stored in memory 116 of the device) is malicious, or non-malicious, based on the fuzzy hash space to the nearest neighbor to known malicious files or code and (ii) whether the target code 119 is non-malicious, or malicious, based on the distance to nearest neighbor known clean files or codes. Indeed, the VPT hash classification model 108 can be generated using training files or codes comprising both known malicious files/code and clean files/code to which the fuzzy hash space for the target code 119 can be assessed. The VPT hash classification model 108' can include a vantage-point tree data structure having nodes that are labeled based on the training files to which the distance metric is measured.

In the example shown in FIG. 1A (or FIG. 1B), the VPT hash classification model 108 (shown in further detail in 108") is configured to generate a score or output value 121 corresponding to a determined fuzzy hash space value of the distance (e.g., 118) of the hash of the target file or code 119 to the nearest fuzzy hash space neighbor (shown as nearest tree node) in a searched VPT structure (e.g., per diagram 122). Diagram 122 shows an example representation of a generated VPT structure. Additional and further examples of a vantage-point tree data structure can be found in Choi, S, "What is a Good Nearest Neighbors Algorithm for Finding Similar Patches in Images?" Applied Sciences 10.15 (2020): 5173, which is incorporated by reference herein.

The output 121 of the VPT hash classification model 108" is provided to a threshold operator 124. The threshold operator 124 determines whether the output value 121 is in a range 126a associated with high confidence that the target code 119 is a malicious file, a range 126b associated with high confidence that the target code 119 is a non-malicious file, or a range 126c associated with low confidence of either (shown as "low confidence" or unknown). That is, the fuzzy hash space of the target code 119 indicates it is being searched against a set of malicious or non-malicious files that appears to be different from those used in the training data set 112, 114. Based on this classification, the anti-malware application 105 may initiate the deeper, more computationally intensive evaluation of the target code using the malware classification machine-learning model 110'. Examples of machine learning models are described in U.S. patent application Ser. No. 17/725,718, which is incorporated by reference herein.

For example, in FIG. 1A (or FIG. 1B), for a range of 0-1, the threshold 128 that defines a non-malicious code can be set for 0.3 where an output value 121 of 0.3 or less indicates a non-malicious code, a threshold 130 for a malicious code can be set to 0.7 where an output value 121 of 0.7 higher indicates a malicious code, and an output value 121 between 0.3 and 0.7 indicates low confidence of either. Other threshold values, for example, set points and ranges (e.g., "−1" and "1" or any other ranges), can be used and determined through simple experimentation. The threshold can be reversed, e.g., 0.7 and higher denoting non-malicious and 0.3 or less denoting malicious code, which can be dependent on the labels.

In some embodiments, multiple output values 121 may be generated, e.g., for fuzzy hashes to which multiple distance metrics may be generated. For the evaluation step (e.g., 208), the multiple output values 121 may be aggregated to a single value, e.g., using an average or mode operator.

Example System #2

FIG. 1B shows another example anti-malware application environment comprising a service provider computing system and a set of client devices configured to perform locality-sensitive hashing evaluation (e.g., fuzzy hash) using a vantage-point tree (VPT) structure in accordance with another illustrative embodiment.

In the example shown in FIG. 1B, the service provider computing system 102 also includes the set of model generation modules (106a. 106b) configured to generate the model 108 for a locality-sensitive hashing model having a vantage-point tree data structure and a machine learning classification model 110 for malware detection from the libraries of known malware 112' and known non-malware code 114'. The malware and non-malware code (112, 114) may be binary files or snippets/portions of binary files. Non-binary instruction libraries may be converted to binary files as a part of the data preparation or normalization process.

Models 108' and 110' are maintained, in the example of FIG. 1B, at another set of computing devices 102 (shown as 102') of the service provider computing system or at the system itself 102 (not shown). In some embodiments, the service provider computing system 102' as runtime/production computing resource can provide the anti-malware application 105 (shown as 105") that can scan, via concurrent operation with the cloud infrastructure, for malware code in a computer-executable file or parseable computer instructions of a computer-executable script. As shown in FIG. 1B, the anti-malware application 105' of the client device 104 (shown as "Client Device #1" 104a or "Client device #n" 104b) can respectively generate the fuzzy hashes for the local target code 119 and transmit the fuzzy hashes, or one or more files derived therefrom, through a network 132 to the service provider computing system 102'. The service provider computing system 102' can scan the received files from the client devices 104a, 104b via models 108' and 110', e.g., as described in relation to those in FIG. 1A, and transmit results back to the anti-malware application 105'.

As noted above, the file may be a computer-executable file (e.g., a binary file), an encoded/compressed file of the same, or a set of files. The file may be embedded or attached in electronic communication (e.g., email). The computer-executable script may be descriptive mark-up language (non-binary file) for a document or website component to be parsed or executed by a web browser. The computer-executable script may be cascading style sheet (CSS) files that are called upon or operate with the script. The files may execute on a personal computing device such as laptops or tablets, a computer server, a mobile device such as a smartphone, network equipment such as a router or switch, a network-connected machine-to-machine (M2M), or an Internet-of-Thing (IoT) device such as a home-networked-camera, appliance, home controller, as well as industrial or manufacturing-network equipment.

In some embodiments, the service provider computing system 102' may make available the fuzzy hash of the target code to the service provider computing system 102, which can store the fuzzy hash of the target code as an additional/ updated code to the libraries of known malware 112' and known non-malware code 114'.

Example Method of Operation

Figure 2:
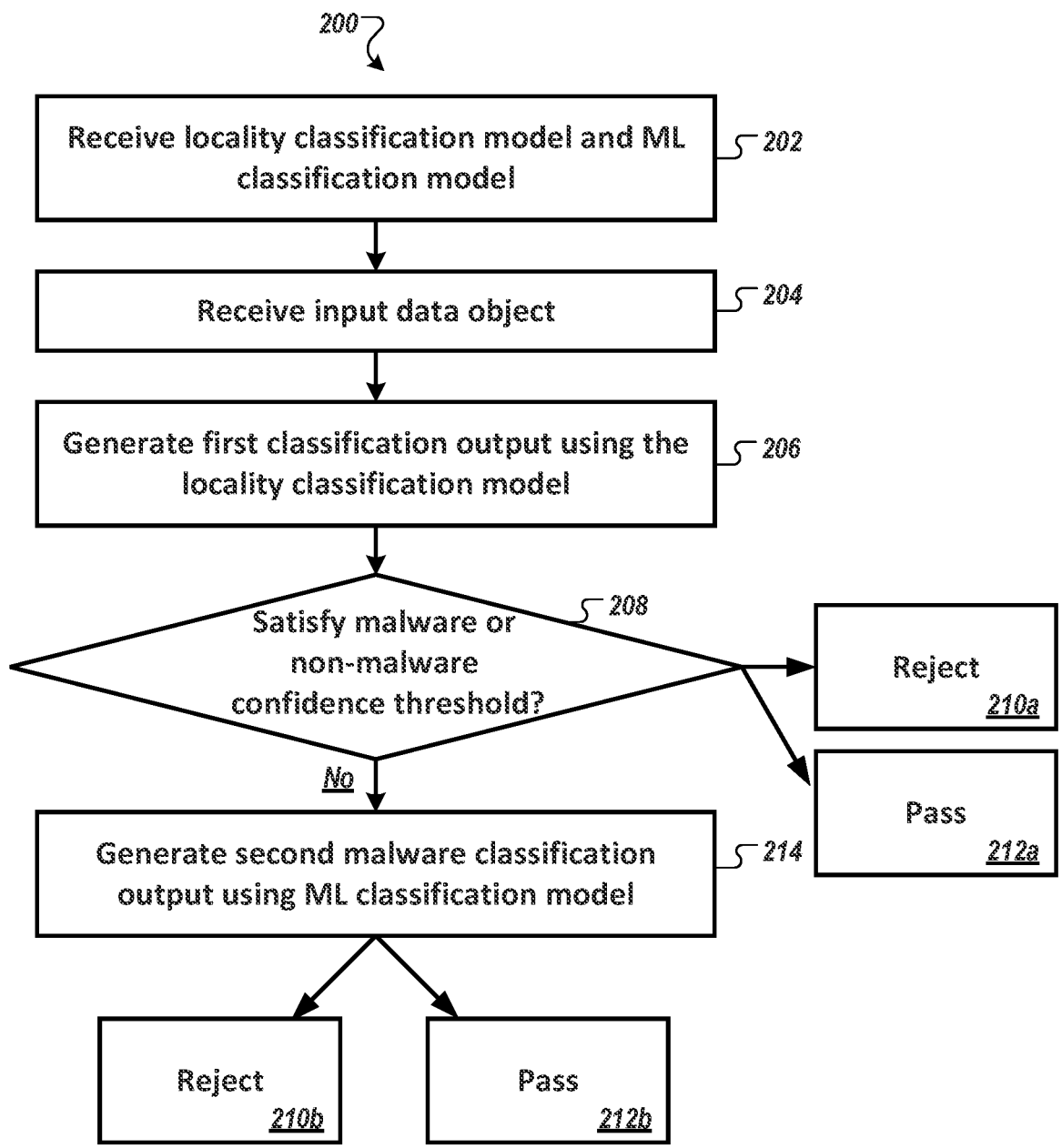
FIG. 2 shows an example method of operation of the system of FIG. 1A or 1B in accordance with an illustrative embodiment.

FIG. 2 shows an example method 200 in accordance with an illustrative embodiment. Method 200 includes receiving (202) locality classification model and ML classification model. Method 200 then includes receiving (204) input data objects. Method 200 then includes generating (206) the first classification output (e.g., 121) using the locality classification model (e.g., 108).

Method 200 then includes identifying (208) whether the first malware classification output fails to satisfy a confidence threshold (e.g., 128 or 130) or does satisfy a confidence threshold (e.g., 128 or 130) for at least one of the malicious code classification or non-malicious code classification. Where the output value 121 exceeds the threshold 130 of the malicious code classification or the threshold 128 of the non-malicious code classification, the anti-malware application 105 may stop the subsequent analysis for that target code 119 and move to the next target code.

The anti-malware application 105 may perform a rejection action 210a based on the output value 121 exceeding the threshold 130 (e.g., greater than a threshold value) of the malicious code classification. The anti-malware application 105 may perform a quarantine/pass/allowance action 212a based on the output value 121 exceeding the threshold 128 (e.g., less than a threshold value) of the non-malicious code classification.

For a rejection action 210 (e.g., 210a, 210b), the anti-malware application 105 may generate a notification that the target code is a malicious code or a non-malicious code, respectively. The anti-malware application 105 may perform other malware-based tasks/actions, e.g., quarantining, cleaning, etc. In some embodiments, the anti-malware application 105 may present a user interface data with user-selectable interface elements for the user to choose whether to quarantine the file, delete the file, label the file as clean, and the like.

For a quarantine/pass/allowance action 212 (e.g., 212a, 212b), the anti-malware application 105 may move onto the next target code 119 for the analysis. In either action 210, 212, the anti-malware application 105 would end the scan of the current target code 119 and move on to the next target code in the analysis.

Based on the quarantine/pass/allowance action 212 and the rejection action 210, the anti-malware application 105 may make available the fuzzy hash of the current target code to the service provider computing system 102, which can store the fuzzy hash of the target code as an additional code to the libraries of known malware 112' and known non-malware code 114'.

Where the output value 121 does not exceed the threshold values for an indication of malicious code or non-malicious code, the anti-malware application 105 can then perform 214 a second analysis using the machine learning classification model (e.g., 110). Machine learning malware classification model can generate a predictive output describing an inferred determination relating to whether or not a file (e.g., a document, an image, a program, and/or the like) is malicious or non-malicious. In some embodiments, the malware classification machine learning model may be a supervised or unsupervised machine learning model (e.g., neural network model, encoder model, and/or clustering model).

Multi-Results Fast VPT Hash Classification Model

The VPT hash classification model 108 can be employed during a malware scan to quickly find the nearest neighbor. The Vantage-point tree may be first generated, and the generated model can then subsequently search with respect to a new target code.

VPT Tree Generation. To generate a VPT tree for malware and non-malware files, a vantage point (VP) may be first randomly selected. The model generator (e.g., model generation modules 106) may compute the distances between the vantage point and the other points by setting the radius of the vantage point to the median of the distances. The model generator may then classify the points into two groups: an inner group and an outer group in which the distance between the vantage point and a point in the inner group is less than the radius of the vantage point. The distance between the vantage point and a point in the outer group may be greater than the radius of the vantage point. Then, the points in the inner group may then be assigned to the left subtree of the vantage point, and the points in the outer group may then be assigned to the right subtree. This process is typically recursively repeated in the subtree.

VPT Tree Search. During a scan, the generated vantage-point tree can be traversed from the root node. Typically, a tree is traversed by recursively exploring all children that intersect a hyperball of a pre-defined fuzzy hash space around the query point, e.g., using a triangle inequality and fuzzy hash stored in each node. Once a list of leaf nodes is found, each contained fuzzy hash may be verified as being within the target hash. This step is usually the most expensive computationally because it requires a large number of fuzzy hash space computations.

i. Speed resource optimization. To optimize the process of the fuzzy hash search operation, a tree is created according to the VPT structure, which can be used to find the nearest hashes (neighbors) much faster. The fuzzy hash VPT search can be performed from an operating list of nodes in a non-recursive manner to determine the fuzzy hash distance of the target or query file to the node. In this manner, the VPT search can determine the fuzzy hash space of the query file and the node in the tree.

To further improve the speed for a set of target/query files, the search can stop a search when an exact match (e.g., distance=0) is found for a given node for the current target code and proceed to the next target code. In addition, the search may limit the number of search results to a pre-defined number (e.g., 100 nearest neighbors), i.e., top-K selection. The search results may be maintained in a binary heap, e.g., that maintains the search results in a binary tree. The parent/child relationship in a heap may be defined implicitly by the elements' indices in an array. By reducing the search set to CPU cache (e.g., L2) level availability, memory caching could be employed to further speed up the search.

ii. Multiple search results. In addition, the operation of traversing the vantage-point tree structure during a search can be configured to collect multiple search results, e.g., when the distance between query fuzzy hash and vantage fuzzy is close to the vantage distance, which the median distance of a particular vantage had to other hashes during the VPT structure building, then the operation can perform multiple result evaluations. Also, a threshold can be set with a particular distance, if the fuzzy hash is within that space, then the operation can also perform multiple result evaluations. Any distance would be between two hashes only. A binary search tree has a property that each node (that is not a leaf node) to redirect the search to two directions, e.g., left or right, depending on a query value. Because files do not have values, the VPT structure may be employed for the files to be evaluated based on distances. In a VPT search, the query file may be compared with a node's vantage object using a distance d that is calculated. If d is less than the vantage point, then the search propagates to the left nodes; otherwise, the search propagates to the right nodes. If d equals "0," the vantage object may be returned. As the search is propagated via VPT, the vantage object with the closest distance is returned as a search result for the closest object. Classical VPT returns only one object.

To construct a conventional tree, on each split (e.g., parent-children relationship and the rule when the search should be redirected to left or right), there is an object list that needs to be propagated further as children. In VPT, one item is sampled from this list without replacement, and that object becomes a vantage object. Fuzzy hash spaces of the remaining files may be calculated to the vantage object and then may be sorted from closest to farthest using fuzzy hash space. The median distance from that distances list may be selected; that distance becomes a vantage point. All files having fuzzy hash space smaller than the vantage point may be propagated to the left nodes, otherwise to the right nodes. These are rebuilt recursively (or iteratively). The node itself gets assigned with vantage object and vantage distance.

It has been observed that classical VPT can find results to close objects but not necessarily the closest one. It may be attributed to the "hard split" on the vantage object/vantage point. For example, assume for a set of multiple files that all are very close to each other in the context of the VPT algorithm, a search of those files would likely follow the same nodes because of their similarity to one another; the search would continue until the algorithm reaches a node that will redirect one file to the left, others to the right. And here is a hard split. Query files that are redirected to the left branch would not "reach" objects on the right branch, and vice-versa.

To reduce the effects of the hard split in the search and produce multiple results, including the closest result, the instant algorithm can first determine these "problematic" objects that are "around" vantage point, e.g., within some threshold (e.g., Id<threshold1) or the other condition discussed herein, and then the algorithm can propagate to both directions, left and right, and store the multiple results in a limited heap that contains a set of neighbors. In providing multiple results that include the nearest neighbor, the accuracy of the search is improved. In addition, the limited heap implementation ensures the greedy algorithm does not conflate the required run-time resources.

Example Multi-Results Fast VPT Search Operation

Figure 3:
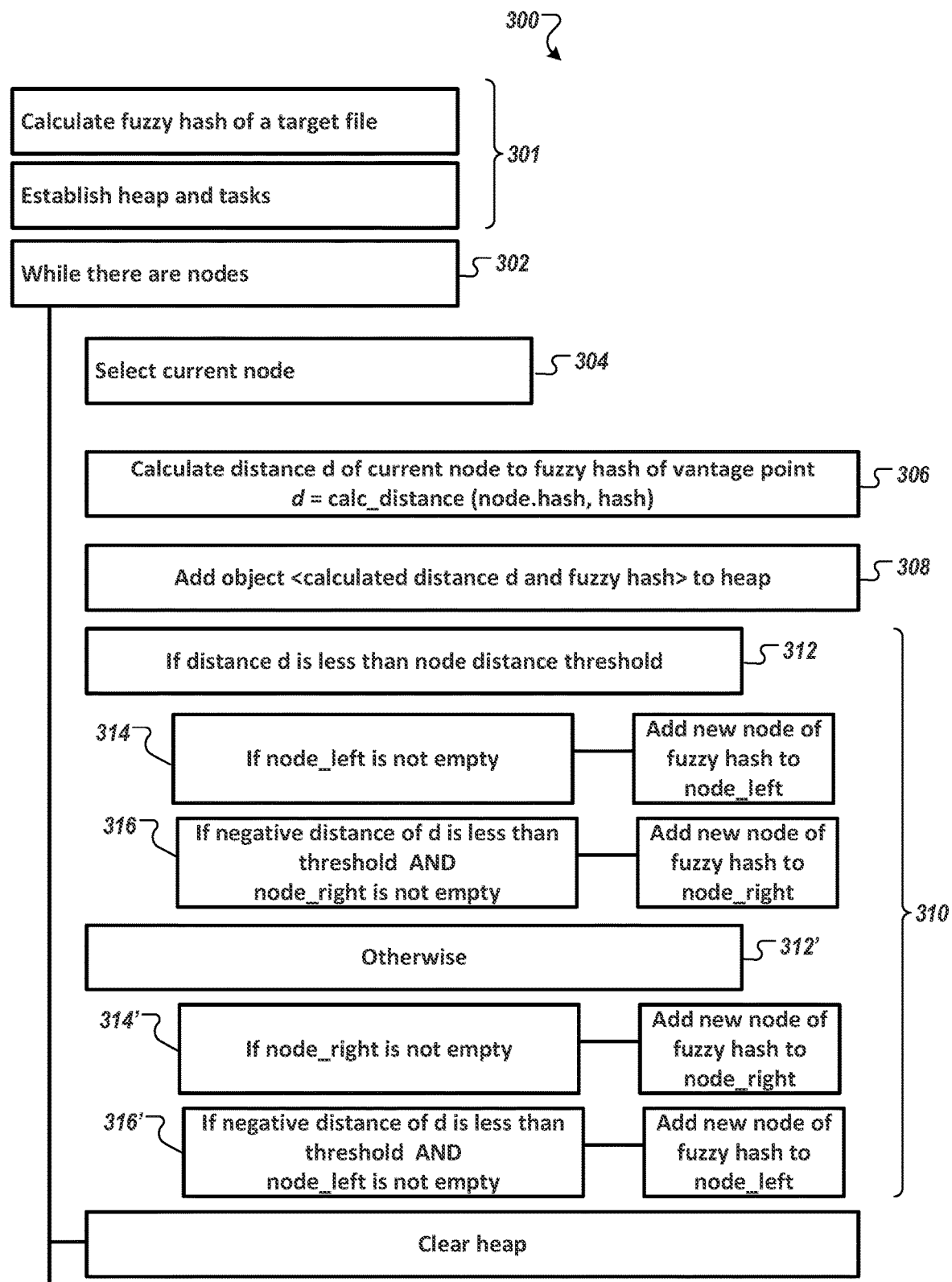
FIG. 3 shows an example method of executing a vantage-point tree search operation in accordance with an illustrative embodiment.

FIG. 3 shows an example method 300 of executing a multi-result fast VPT search operation (e.g., 206), e.g., on a computing device as described in relation to FIG. 1A or a back-end server as described in relation to FIG. 1B. FIG. 5 shows an example implementation of the multi-result fast VPT search operation (e.g., 206). The operation of FIG. 3 may be first performed after a vantage point tree structure has been generated for a library of malware and non-malware code. The malware service can provide the index of the vantage point tree structure to the client device, which can, during runtime operation, calculate a fuzzy hash of a target code (e.g., 119) to search for the vantage point tree structure.

In some embodiments, the vantage point tree structure can be maintained at the back-end server, and the client device can determine the fuzzy hash of the target code (e.g., 119) and transmit the fuzzy hash to the malware service, e.g., located on cloud infrastructure. The cloud infrastructure can search the vantage point tree structure, per FIGS. 3 and 5, with the fuzzy hash of the target code, and provide the results back via a response. In this embodiment, the cloud infrastructure may add the fuzzy hash of new target code to the database or malware and non-malware code once appropriate labels for them have been generated (e.g., subsequent to the second classification operation). The addition of fuzzy hash of the new target code may be added as a batch once they have been confirmed as being malware and non-malware code.

In the example shown in FIG. 3, to reduce the memory usage in the search, method 300 includes executing (302) a while loop for a pre-defined list of tasks. In the while loop (302), for each iteration of the loop, the VPT search operation (i) selects (304) the current node as a task (ii) calculates (306) the distance of the current node to the pre-defined fuzzy hash, (iii) adds (308) the calculated distance of the heap, and (iv) evaluates (310) the fuzzy hash to the nodes. The heap is limited to a pre-defined size in that as a new search result is added to the heap, the heap size is re-checked, and the farthest neighbor in the heap (e.g., the last element) is removed. And during the evaluation phase (310), a new node for the fuzzy hash is added to the left or right node depending on the calculated distance d. After traversing a certain number of VPT nodes, those nodes are added to the heap (if the node has a lower distance than the furthest node), and further nodes in the heap are removed. In some embodiments, at the end of the while loop, the heap is cleared for a target code, and the process can be restarted for a new target code. For multiple target code, the tasks can be generated once and reused. For multiple core hardware, multiple processes can be initialized to execute in a parallel manner.

Figure 4:
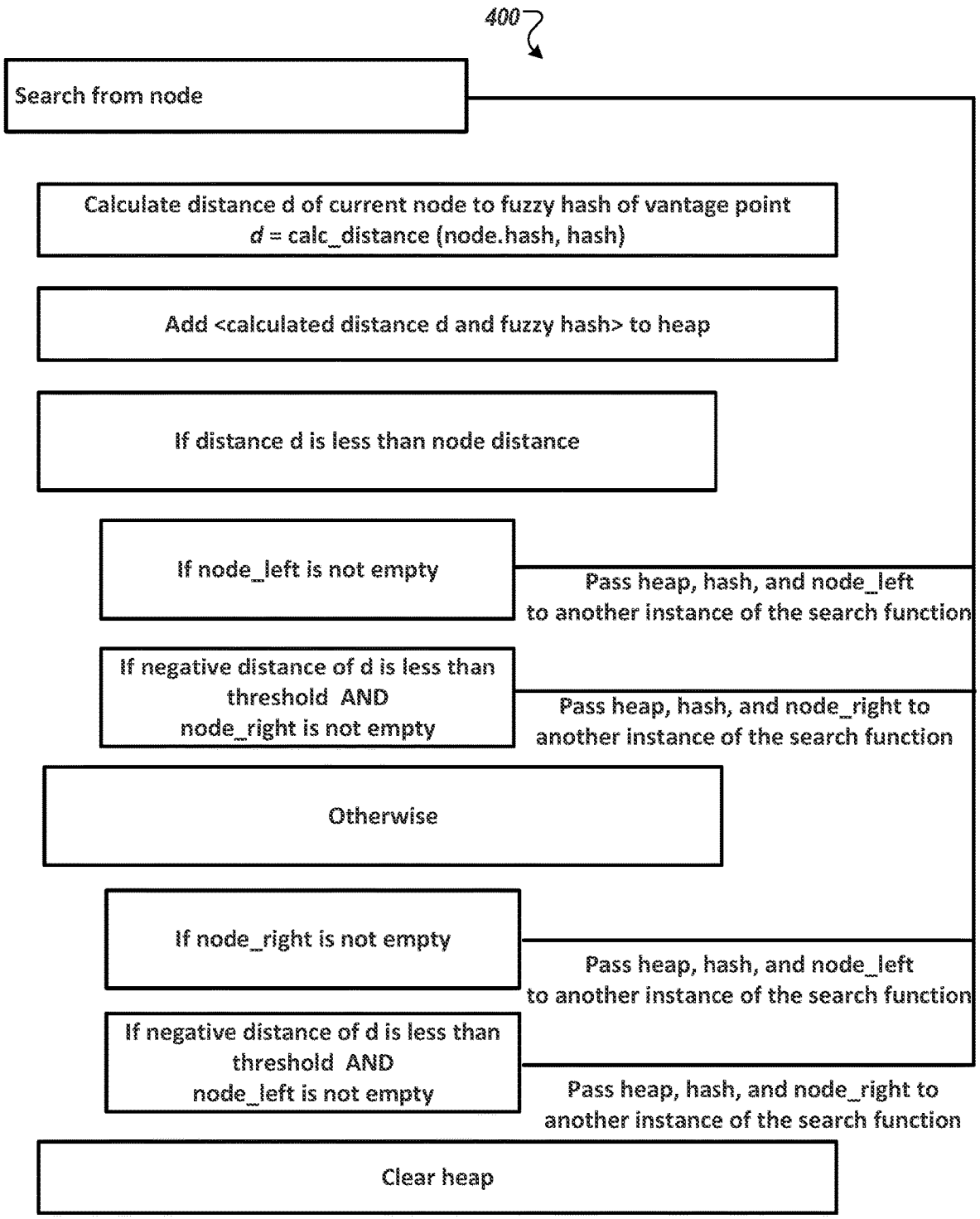
FIG. 4 shows another example method of executing a vantage-point tree search operation in accordance with another illustrative embodiment.

Also, in the example shown in FIG. 3 (as well as FIG. 4), to provide results that are the nearest matching to the training data set, multiple results are returned in the search. To do so, in operation 310, the Method first determines "problematic" objects that are "around" vantage point within some threshold (Id<thresholdl) or other conditions described herein and then propagates the search to both directions, left and right. In the example shown in FIG. 3, Method 300 determines (312, 312') if the distance d is less than a pre-defined node distance threshold or within a fuzzy hash space and directs (314, 314') the search to the left nodes or right nodes, accordingly. In addition, Method 300 also determines (316, 316') if the negative distance of d is less than the pre-defined node distance threshold and directs (316, 316') the search to the other nodes. To this end, if the search selects the right nodes, it also evaluates the left nodes if the vantage point is within some threshold (Id<thresholdl), and vice versa, to search the left nodes even when the right nodes are initially selected. To this end, the closest results for both the left and right nodes are provided, and this is provided for each instance where the "problematic" threshold condition is identified. Because the results are added to the heap, which is limited, the additional results do not substantially reduce the efficiency of the search or the resources that are allocated. Similar operations are shown in FIG. 4 for the recursive operation.

In FIG. 5, the threshold operation (Id<thresholdl) is performed to return a Boolean result e (see lines 20-21 of FIG. 5), which is performed at lines 27 and 37 for the non-selected node side. At lines 23-26, the search is tasked for the left-side nodes based on the closest evaluation, and, at lines 27-28, a second search is also tasked for the right-side nodes based on the threshold operation.

Referring back to FIG. 3, a node refers to a VPT tree node having attribute values: (i) hash—fuzzy hash of vantage object (i.e., target code during runtime, known malicious files, and non-malicious files during the tree generation), (ii) distance—vantage point between the target code and the node, (iii) left—left child, and (iv) right—right child. The vpt_root refers to a root node of the VPT tree. The object refers to a query object to find the nearest neighbors. The calc_fuzzy_hash(object) function refers to a function for calculating the fuzzy hash for a given object. The calc_distance(hash1, hash2) function refers to a function for calculating the distance between objects given their fuzzy hashes. Examples of fuzzy hashes include Nilsimsa, TLSH, SSDEEP, or sdhash (https://www.microsoft.com/security/blog/2021/07/27/combing-through-the-fuzz-using-fuzzy-hashing-and-deep-learning-to-counter-malware-detection-evasion-techniques/). The heap refers to a limited-size heap storing distances and hashes of nearest neighbors. New search results are added to the heap, and, on each addition, heap size is checked; if it is larger than the limit, the farthest neighbor is removed. The vpt refers to a VPT tree with no hash duplicates.

It has been observed that the optimized/iterative VPT operation can operate more quickly and with substantially fewer computing resources making it more commercially viable in a classification operation. The conventional recursive approach (left table of FIG. 5) employs a function that is called recursively (in the example, it is shown as search_from_node, see lines 9, 25, 30, 35, and 40 in FIG. 5). Because the memory is allocated with each recursive call, the operation becomes memory-inefficient as the tree grows and for large trees.

In contrast, an iterative VPT tree (e.g., non-recursive VPT tree) is searched by storing nodes as a list of tasks that are iteratively evaluated. The heap is established once for a given iteration, and nodes are added during the search as tasks to the list (see task.add at lines 25, 29, 34, and 39 of FIG. 5). To this end, after traversing a certain number of VPT nodes, the algorithm then determines whether those nodes should be added to the heap (if the node has lower distance than the furthest node) and further nodes in the heap can be removed.

In addition, the optimized/iterative VPT operation may enable the operation to be performed with hardware-assisted processing. By substantially reducing the memory usage, the optimized/iterative VPT operation may be performed using CPU caching (e.g., L2 caching) and other caching operations. In contrast, conventional VPT operations (e.g., recursive operation) with larger memory requirements may have to rely on the operating system page files.

FIG. 4 shows an example method 400 of a VPT hash classification model 108 that is configured to evaluate the fuzzy hash in a recursive manner. Methods 300 or 400 may be used in combination with the hierarchical or multi-level classification operation described in relation to FIG. 2. An example implementation of the operation 400 is provided in FIG. 5.

As compared to the operation shown in FIG. 3, the recursive VPT tree is also configured to compute the fuzzy hash distance by setting the radius of the vantage point to the median of the distances. The model generator may then classify the points into two groups: an inner group and an outer group in which the distance between the vantage point and a point in the inner group is less than the radius of the vantage point. The distance between the vantage point and a point in the outer group may be greater than the radius of the vantage point. Then, the points in the inner group may then be assigned to the left subtree of the vantage point, and the points in the outer group may then be assigned to the right subtree. This process is performed recursively for a subtree by calling the same search function again and passing the heap, hash, and current node to another instance of that function. To this end, the previous heap of the prior function calls is maintained, which adds to the computing requirements for this implementation.

Machine Learning Malware Classification

The malware classification machine learning model may be a supervised or unsupervised machine learning model (e.g., neural network model, encoder model, and/or clustering model) that is configured to be trained using labeled data, where the machine learning model is configured to generate a predictive output with respect to an input data object describing an inferred determination relating to whether or not the input data object is likely to be malicious. The output of the malware classification machine learning model may, in turn, be used to perform one or more malware-based actions.

As used herein, the term "artificial intelligence" can include any technique that enables one or more computing devices or comping systems (i.e., a machine) to mimic human intelligence. Artificial intelligence (AI) includes but is not limited to knowledge bases, machine learning, representation learning, and deep learning. The term "machine learning" is defined herein to be a subset of AI that enables a machine to acquire knowledge by extracting patterns from raw data. Machine learning techniques include, but are not limited to, logistic regression, support vector machines (SVMs), decision trees, Naïve Bayes classifiers, and artificial neural networks. The term "representation learning" is defined herein to be a subset of machine learning that enables a machine to automatically discover representations needed for feature detection, prediction, or classification from raw data. Representation learning techniques include, but are not limited to, autoencoders. The term "deep learning" is defined herein to be a subset of machine learning that enables a machine to automatically discover representations needed for feature detection, prediction, classification, etc., using layers of processing. Deep learning techniques include but are not limited to artificial neural networks or multilayer perceptron (MLP).

Machine learning models include supervised, semi-supervised, and unsupervised learning models. In a supervised learning model, the model learns a function that maps an input (also known as a feature, or features) to an output (also known as target or target) during training with a labeled data set (or dataset). In an unsupervised learning model, the model learns a pattern in the data. In a semi-supervised model, the model learns a function that maps an input (also known as a feature or features) to an output (also known as a target) during training with both labeled and unlabeled data.

Neural Networks. An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can be arranged in a plurality of layers, such as an input layer, an output layer, and optionally one or more hidden layers. An ANN having hidden layers can be referred to as a deep neural network or multilayer perceptron (MLP). Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement an activation function (e.g., binary step, linear, sigmoid, tanH, or rectified linear unit (ReLU) function), and provide an output in accordance with the activation function. Additionally, each node is associated with a respective weight. ANNs are trained with a dataset to maximize or minimize an objective function. In some implementations, the objective function is a cost function, which is a measure of the ANN's performance (e.g., error such as L1 or L2 loss) during training, and the training algorithm tunes the node weights and/or bias to minimize the cost function. This disclosure contemplates that any algorithm that finds the maximum or minimum of the objective function can be used for training the ANN. Training algorithms for ANNs include but are not limited to backpropagation. It should be understood that an artificial neural network is provided only as an example machine learning model. This disclosure contemplates that the machine learning model can be any supervised learning model, semi-supervised learning model, or unsupervised learning model. Optionally, the machine learning model is a deep learning model. Machine learning models are known in the art and are therefore not described in further detail herein.

A convolutional neural network (CNN) is a type of deep neural network that has been applied, for example, to image analysis applications. Unlike traditional neural networks, each layer in a CNN has a plurality of nodes arranged in three dimensions (width, height, and depth). CNNs can include different types of layers, e.g., convolutional, pooling, and fully-connected (also referred to herein as "dense") layers. A convolutional layer includes a set of filters and performs the bulk of the computations. A pooling layer is optionally inserted between convolutional layers to reduce the computational power and/or control overfitting (e.g., by downsampling). A fully-connected layer includes neurons, where each neuron is connected to all of the neurons in the previous layer. The layers are stacked similarly to traditional neural networks.

Other Supervised Learning Models. A logistic regression (LR) classifier is a supervised classification model that uses the logistic function to predict the probability of a target, which can be used for classification. LR classifiers are trained with a data set (also referred to herein as a "dataset") to maximize or minimize an objective function, for example, a measure of the LR classifier's performance (e.g., an error such as L1 or L2 loss), during training. This disclosure contemplates that any algorithm that finds the minimum of the cost function can be used. LR classifiers are known in the art and are therefore not described in further detail herein.

An Naïve Bayes' (NB) classifier is a supervised classification model that is based on Bayes' Theorem, which assumes independence among features (i.e., the presence of one feature in a class is unrelated to the presence of any other features). NB classifiers are trained with a data set by computing the conditional probability distribution of each feature given a label and applying Bayes' Theorem to compute the conditional probability distribution of a label given an observation. NB classifiers are known in the art and are therefore not described in further detail herein.

A k-NN classifier is a supervised classification model that classifies new fuzzy hash based on similarity measures (e.g., distance functions). The k-NN classifiers are trained with a data set (also referred to herein as a "dataset") to maximize or minimize a measure of the k-NN classifier's performance during training. The k-NN classifiers are known in the art and are therefore not described in further detail herein.

A majority voting ensemble is a meta-classifier that combines a plurality of machine learning classifiers for classification via majority voting. In other words, the majority voting ensemble's final prediction (e.g., class label) is the one predicted most frequently by the member classification models. The majority voting ensembles are known in the art and are therefore not described in further detail herein.

Example Computing Environment. An exemplary computing environment that may implement the anti-malware server or client device may include various numerous computing devices environments or configurations. Examples of computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media, including memory storage devices.

An exemplary system, in its most basic configuration, may include at least one processing unit and memory. A processing unit may include one or more processing elements (e.g., reduced instruction set computing (RISC) cores or complex instruction set computing (CISC) cores, etc.) that can execute computer-readable instructions to perform a pre-defined task or function. Depending on the exact configuration and type of computing device, memory may be volatile (such as random-access memory (RAM)), non-volatile (such as read-only memory (ROM), flash memory, etc.), or some combination of the two.

The computing device may have additional features/functionality. For example, the computing device may include additional storage (removable and/or non-removable), including, but not limited to, magnetic or optical disks or tape.

The computing device may include a variety of computer-readable media. Computer-readable media can be any available media that can be accessed by the device and includes both volatile and non-volatile media, removable and non-removable media.

Computer storage media include volatile and non-volatile, and removable and non-removable media implemented in any method or technology for storage of information such as computer-readable instructions, data structures, program modules, or other data. Memory, removable storage, and non-removable storage are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device. Any such computer storage media may be part of the computing device.

The computing device may contain communication connection(s) that allow the device to communicate with other devices. The computing device may also have input device(s) such as a keyboard, mouse, pen, voice input device, touch input device, etc. Output device(s) such as a display, speakers, printer, etc., may also be included. All these devices are well-known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

It must also be noted that, as used in the specification and the appended claims, the singular forms "a," "an," and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The following patents, applications, and publications, as listed below and throughout this document, describes various application and systems that could be used in combination the exemplary system and are hereby incorporated by reference in their entirety herein:

[1] Kumar, Neeraj, Li Zhang, and Shree Nayar. "What is a good nearest neighbors algorithm for finding similar patches in images?." European conference on computer vision. Springer, Berlin, Heidelberg, 2008.

[2] Fuzzy hash: https://www.microsoft.com/security/blog/2021/07/27/combing-through-the-fuzz-using-fuzzy-hashing-and-deep-learning-to-counter-malware-detection-evasion-techniques/

[3] Choi, Sunoh. "Combined kNN Classification and hierarchical similarity hash for fast malware detection." Applied Sciences 10.15 (2020): 5173.

[4] Oliver, Jonathan; Ali, Muqeet; Liu, Haoping; Hagen, Josiah, "Fast Clustering of High Dimensional Data Clustering the Malware Bazaar Dataset," (http://tlsh.org/papersDir/n21_opt_cluster.pdf).

APPENDIX #1

Embodiment 1. A method for generating a malware classification output for a target code, the method comprising:
  receiving the target code;
  identifying, via a similarity-based operation comprising a locality-sensitive hashing operation assessed using one or more vantage-point tree structures, as a first malware classification operation, a malware classification output with respect to the target code, wherein the similarity-based operation is performed entirely using CPU caching;
  in an instance in which the first malware classification output fails to satisfy a first confidence threshold associated with a malware classification or a second confidence threshold associated with a non-malware classification, generating, using a trained malware classification machine learning model, a second malware classification output; and
  performing one or more malware-based actions, including to reject, pass, and/or quarantine the target code, based on the first malware classification output or the second malware classification output.

Embodiment 2. The method of Embodiment 1, wherein the second malware classification output comprises a trained neural network model.

Embodiment 3. The method of Embodiment 1 or 2, wherein the trained malware classification machine learning model is not executed until after the first malware classification output is generated.

Embodiment 4. The system of any one of Embodiments 1-3, wherein the similarity-based operation is assessed with respect to a library of malware code.

Embodiment 5. The method of any one of Embodiments 1-4, wherein the similarity-based operation is further assessed with respect to library of non-malware code.

Embodiment 6. The method of any one of Embodiments 1-5, wherein the similarity-based operation calculates a first distance value of fuzzy hashes of the target code to nodes in a first vantage-point tree structure of the one or more vantage-point tree structures, wherein the nodes in the first vantage-point tree structure are generated by a first set of malware code, and wherein the similarity-based operation calculates a second distance value of fuzzy hashes of the target code to nodes in a second vantage-point tree structure, wherein the nodes in the second vantage-point tree structure are generated by a set of non-malware code or a second set of malicious code that is different from the first set of malicious code.A Embodiment 7. The method of any one of Embodiments 1-6, wherein the similarity-based operation generates multiple search results.

Embodiment 8. A system comprising:
  a processor; and
  a memory having instructions stored thereon for generating a malware classification output for a target code, wherein execution of the instructions by the processor causes the processor to:
    receive the target code;
    identify, via a similarity-based operation comprising a fast locality-sensitive hashing operation assessed using one or more vantage-point tree structures, as a first malware classification operation, a malware classification output with respect to the target code;
    in an instance in which the first malware classification output fails to satisfy a first confidence threshold associated with a malware classification or a second confidence threshold associated with a non-malware classification, generate, using a trained malware classification machine learning model, a second malware classification output; and
    perform one or more malware-based actions, including to reject, pass, and/or quarantine the target code, based on the first malware classification output or the second malware classification output.

Embodiment 9. The system of Embodiment 8, wherein the second malware classification output comprises a trained neural network model.

Embodiment 10. The system of Embodiments 8 or 9, wherein the trained malware classification machine learning model is not executed until after the first malware classification output is generated.

Embodiment 11. The system of any one of Embodiments 8-10, wherein the similarity-based operation is assessed with respect to a library of malware code.

Embodiment 12. The system of any one of Embodiments 8-11, wherein the similarity-based operation is further assessed with respect to a library of non-malware code.

Embodiment 13. The system of any one of Embodiments 8-12, wherein the similarity-based operation calculates a first distance value of fuzzy hashes of the target code to nodes in a first vantage-point tree structure of the one or more vantage-point tree structures, wherein the nodes in a first vantage-point tree structure are generated by a first set of malware code, and
  wherein the similarity-based operation calculates a second distance value of fuzzy hashes of the target code to nodes in a second vantage-point tree structure, wherein the nodes in the second vantage-point tree structure are generated by a set of non-malware code or a second set of malicious code that is different from the first set of malicious code.

Embodiment 14. The system of any one of Embodiments 8-13, wherein the fuzzy hashes of the target code are added to the set of non-malware code or the set of malware code to be subsequently used to update at least one of the first vantage-point tree structure or the second vantage-point tree structure.

Embodiment 15. A non-transitory computer-readable medium having instructions stored thereon for generating a malware classification output for a target code, wherein execution of the instructions by a processor causes the processor to:
  receive the target code;
  identify, via a similarity-based operation comprising a fast locality-sensitive hashing operation assessed using one or more vantage-point tree structures, as a first malware classification operation, a malware classification output with respect to the target code;
  in an instance in which the first malware classification output fails to satisfy a first confidence threshold associated with a malware classification or a second confidence threshold associated with a non-malware classification, generate, using a trained malware classification machine learning model, a second malware classification output; and perform one or more malware-based actions, including to reject, pass, and/or quarantine the target code, based on the first malware classification output or the second malware classification output.

Embodiment 16. The computer-readable medium of Embodiment 15, wherein the second malware classification output comprises a trained neural network model.

Embodiment 17. The computer-readable medium of any one of Embodiments 15-16, wherein the trained malware classification machine learning model is not executed until after the first malware classification output is generated.

Embodiment 18. The computer-readable medium of any one of Embodiments 15-17, wherein the similarity-based operation is assessed with respect to a library of malware code.

Embodiment 19. The computer-readable medium of any one of Embodiments 15-18, wherein the similarity-based operation is further assessed with respect to a library of non-malware code.

Embodiment 20. The computer-readable medium of any one of Embodiments 15-19, wherein the similarity-based operation calculates a first distance value of fuzzy hashes of the target code to nodes in a first vantage-point tree structure of the one or more vantage-point tree structure, wherein the nodes in a first vantage-point tree structure are generated by a first set of malware code, and wherein the similarity-based operation calculates a second distance value of fuzzy hashes of the target code to nodes in a second vantage-point tree structure, wherein the nodes in the second vantage-point tree structure are generated by a set of non-malware code or a second set of malicious code that is different from the first set of malicious code.

APPENDIX #2

Embodiment 21. A method comprising:
receiving a target code comprising at least one of a file or data object being scanned for a presence or non-presence of malware;
identifying, via a similarity-based operation comprising a locality-sensitive hashing operation assessed using a vantage-point tree structure, as a malware classification operation, a malware classification output with respect to the target code;
in an instance in which the malware classification output satisfies a first similarity threshold, labeling the target code as a non-malware file or object; and
in an instance in which the malware classification output satisfies a second similarity threshold, labeling the target code as a malware file or object.

Embodiment 22. The method of Embodiment 21, further comprising:
determining, via a vantage-point tree search operation, a vantage-point tree object for the target code with respect to a set of stored malware-classified files or objects and a set of stored non-malware classified files or object.

Embodiment 23. The method of Embodiment 21 or 22, wherein the vantage-point tree search operation iteratively evaluates in a non-recursive manner each node of the vantage-point tree object as a task, and wherein sub-nodes in the vantage-point tree object are added as new tasks to the iterative operation.

Embodiment 24. The method of any one of Embodiments 21-23, wherein the vantage-point tree search operation evaluates top nearest neighbor distances of a fuzzy hash of the target code in the vantage-point tree object, wherein the vantage-point tree search operation stores top nearest neighbor distances in a heap.

Embodiment 25. The method of any one of Embodiments 21-24, wherein the heap has a pre-defined heap size, wherein in an instance in which the heap size exceeds a predetermined limit, a last element of the heap is removed.

Embodiment 26. The method of any one of Embodiments 21-25, wherein the vantage-point tree search operation is configured to halt operation if a distance of zero is determined for a given node.

Embodiment 27. The method of any one of Embodiments 21-26, wherein the vantage-point tree search operation is configured to evaluate both a left side and a right side of the vantage-point tree object when a distance value for the selection between the left side and a right side is determined to be less than a predefined threshold.

Embodiment 28. A system comprising:
a processor; and
a memory having instructions stored thereon (e.g., for generating a malware classification output for a target code using a malware classification operation based on similarity to known classified files or objects), wherein execution of the instructions by the processor causes the processor to:
receive a target code comprising at least one of a file or data object being scanned for a presence or non-presence of malware;
identify, via a similarity-based operation comprising a locality-sensitive hashing operation assessed using a vantage-point tree structure, as a malware classification operation, a malware classification output with respect to the target code;
in an instance in which the malware classification output satisfies a first similarity threshold, label the target code as a non-malware file or object; and
in an instance in which the malware classification output satisfies a second similarity threshold, label the target code as a malware file or object.

Embodiment 29. The system of Embodiment 28, wherein the instructions for the malware classification operation comprises instructions to:
determine, via a vantage-point tree search operation, a vantage-point tree object for the target code with respect to a set of stored malware-classified files or objects and a set of stored non-malware classified files or object.

Embodiment 30. The system of Embodiment 28 or 29, wherein the vantage-point tree search operation iteratively evaluates each node of the vantage-point tree object as a task, and wherein sub-nodes in the vantage-point tree object are added as new tasks to the iterative operation.

Embodiment 31. The system of any one of Embodiments 28-30, wherein the vantage-point tree search operation evaluates top nearest neighbor distances of a fuzzy hash of the target code in the vantage-point tree object, wherein the vantage-point tree search operation stores top nearest neighbor distances in a heap.

Embodiment 32. The system of any one of Embodiments 28-31, wherein the heap has a pre-defined heap size, wherein in an instance in which the heap size exceeds a predetermined limit, a last element of the heap is removed.

Embodiment 33. The system of any one of Embodiments 28-32, wherein the vantage-point tree search operation is configured to halt operation if a distance of zero is determined for a given node.

Embodiment 34. The system of any one of Embodiments 28-33, wherein the vantage-point tree search operation is configured to evaluate both a left side and a right side of the vantage-point tree object when a distance value for the selection between the left side and a right side is determined to be less than a predefined threshold.

Embodiment 35. A non-transitory computer-readable medium comprising instruction code for generating a malware classification output for a target code using a malware classification operation based on similarity to known classified files or objects, the non-transitory computer-readable medium having instructions stored thereon that, when executed by one or more processors, cause the one or more processors to:
receive the target code comprising at least one of a file or data object being scanned for a presence or non-presence of malware;
identify, via a similarity-based operation comprising a locality-sensitive hashing operation assessed using a vantage-point tree structure, as a malware classification operation, a malware classification output with respect to the target code;
in an instance in which the malware classification output satisfies a first similarity threshold, label the target code as a non-malware file or object; and
in an instance in which the malware classification output satisfies a second similarity threshold, label the target code as a malware file or object.

Embodiment 36. The non-transitory computer-readable medium of Embodiment 35, wherein the instructions for the malware classification operation comprises instructions to:
determine, via a vantage-point tree search operation, a vantage-point tree object for the target code with respect to a set of stored malware-classified files or objects and a set of stored non-malware classified files or object.

Embodiment 37. The non-transitory computer-readable medium of Embodiment 35 or 36, wherein the vantage-point tree search operation iteratively evaluates each node of the vantage-point tree object as a task, and wherein sub-nodes in the vantage-point tree object are added as new tasks to the iterative operation.

Embodiment 38. The non-transitory computer-readable medium of any one of Embodiments 35-37, wherein the vantage-point tree search operation evaluates top nearest neighbor distances of a fuzzy hash of the target code in the vantage-point tree object, wherein the vantage-point tree search operation stores top nearest neighbor distances in a heap.

Embodiment 39. The non-transitory computer-readable medium of any one of Embodiments 35-38, wherein the heap has a pre-defined heap size, wherein in an instance in which the heap size exceeds a predetermined limit, a last element of the heap is removed.

Embodiment 40. The non-transitory computer-readable medium of any one of Embodiments 35-39, wherein the vantage-point tree search operation is configured to evaluate both a left side and a right side of the vantage-point tree object when a distance value for the selection between the left side and a right side is determined to be less than a predefined threshold.

Embodiment 41. A system comprising:
a processor; and
a memory having instructions stored thereon, wherein execution of the instructions by the processor causes the processor to perform any one of the methods of Embodiments 1-7 or 21-27.

Embodiment 41. A non-transitory computer-readable medium having instructions stored thereon, wherein execution of the instructions by a processor causes the processor to perform any one of the methods of Embodiments 1-7 or 21-27 or of the system of Embodiments 8-14 or 28-34.

What is claimed is:

1. A method for detecting malware in a target file, the method comprising:
receiving the target file;
generating one or more fuzzy hashes from the target file using a locality-sensitive hashing operation;
determining a malware classification with respect to the target file by assessing the one or more fuzzy hashes using one or more vantage-point tree structures, wherein assessing the one or more fuzzy hashes comprises iteratively:
comparing a fuzzy hash of the one or more fuzzy hashes to a node of the one or more vantage-point tree structures to determine a distance that measures a similarity of the node and the fuzzy hash;
comparing the distance to a threshold; and
modifying, based on the comparison, a tree data structure by adding two nodes corresponding to children of the node of the one or more vantage-point tree structures;
wherein determining the malware classification comprises analyzing the tree data structure; and
performing a malware-based responsive action based on the malware classification.

2. The method of claim 1, wherein the malware classification is a prediction of whether the target file is malicious.

3. The method of claim 1, wherein assessing the one or more fuzzy hashes further comprises comparing the one or more fuzzy hashes to hashes generated using at least one of a library of malicious code or a library of non-malicious code.

4. The method of claim 1, wherein the node represents a known malware.

5. The method of claim 1, wherein the one or more vantage-point tree structures comprises:
a first vantage-point tree structure, wherein the nodes in the first vantage-point tree structure are generated by a first set of malicious code; and
a second vantage-point tree structure, wherein the nodes in the second vantage-point tree structure are generated by a set of non-malicious code or a second set of malicious code that is different from the first set of malicious code.

6. The method of claim 1, wherein assessing the one or more fuzzy hashes comprises searching for neighboring fuzzy hashes using the one or more vantage-point tree structures.

7. The method of claim 6, wherein searching for the neighboring fuzzy hashes is limited to a CPU cache level.

8. The method of claim 7, wherein the malware-based responsive action comprises at least one of rejecting, passing, or quarantining the target file.

9. A system for determining whether a target file is malicious, the system comprising:
one or more processors; and
memory having instructions stored thereon that, when executed by the one or more processors, cause the system to:
receive the target file;
generate one or more fuzzy hashes from the target file using a locality-sensitive hashing operation;

determining a malware classification with respect to the target file by assessing the one or more fuzzy hashes using one or more vantage-point tree structures, wherein assessing the one or more fuzzy hashes comprises iteratively:
  comparing a fuzzy hash of the one or more fuzzy hashes to a node of the one or more vantage-point tree structures to determine a distance that measures a similarity of the node and the fuzzy hash;
  comparing the distance to a threshold; and
  modifying, based on the comparison, a tree data structure by adding two nodes corresponding to children of the node of the one or more vantage-point tree structures;
    wherein determining the malware classification comprises analyzing the tree data structure; and
  perform a malware-based responsive action based on the malware classification.

10. The system of claim 9, wherein the malware classification is a prediction of whether the target file is malicious.

11. The system of claim 9, wherein assessing the one or more fuzzy hashes further comprises comparing the one or more fuzzy hashes to hashes generated using a library of malicious code.

12. The system of claim 9, wherein assessing the one or more fuzzy hashes further comprises comparing the one or more fuzzy hashes to hashes generated using a library of non-malicious code.

13. The system of claim 9, wherein the node represents a known malware.

14. The system of claim 9, wherein the one or more vantage-point tree structures comprises:
  a first vantage-point tree structure, wherein the nodes in a first vantage-point tree structure are generated by a first set of malicious code; and
  a second vantage-point tree structure, wherein the nodes in the second vantage-point tree structure are generated by a set of non-malicious code or a second set of malicious code that is different from the first set of malicious code.

15. The system of claim 14, wherein a fuzzy hash of the one or more fuzzy hashes are added to the set of non-malicious code or the first set of malicious code or the second set of malicious code to be subsequently used to update at least one of the first vantage-point tree structure or the second vantage-point tree structure.

16. A non-transitory computer-readable medium having instructions stored thereon that, when executed by one or more processors, cause a device to:
  receive a target file;
  generate one or more fuzzy hashes from the target file using a locality-sensitive hashing operation;
  determining a malware classification with respect to the target file by assessing the one or more fuzzy hashes using one or more vantage-point tree structures, wherein assessing the one or more fuzzy hashes comprises iteratively:
  comparing a fuzzy hash of the one or more fuzzy hashes to a node of the one or more vantage point tree structures to determine a distance that measures a similarity of the node and the fuzzy hash;
  comparing the distance to a threshold; and
  modifying, based on the comparison, a tree data structure by adding two nodes corresponding to children of the node of the one or more vantage-point tree structures;
    wherein determining the malware classification comprises analyzing the tree data structure; and
  perform a malware-based responsive action based on the malware classification.

17. The computer-readable medium of claim 16, wherein the malware classification is a prediction of whether the target file is malicious.

18. The computer-readable medium of claim 16, wherein the one or more vantage-point tree structures comprises:
  a first vantage-point tree structure, wherein the nodes in the first vantage-point tree structure are generated by a first set of malicious code; and
  a second vantage-point tree structure, wherein the nodes in the second vantage-point tree structure are generated by a set of non-malicious code or a second set of malicious code that is different from the first set of malicious code.

* * * * *